(12) United States Patent
Patel et al.

(10) Patent No.: US 12,478,003 B2
(45) Date of Patent: Nov. 25, 2025

(54) ENHANCING PHOTOSYNTHESIS USING IoT

(71) Applicant: International Business Machines Corporation, Armonk, NY (US)

(72) Inventors: Mohammad Saad Nazimuddin Patel, Latur (IN); Jagabondhu Hazra, Bangalore (IN); Manikandan Padmanaban, Chennai (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 382 days.

(21) Appl. No.: 18/184,715

(22) Filed: Mar. 16, 2023

(65) Prior Publication Data
US 2024/0306560 A1  Sep. 19, 2024

(51) Int. Cl.
| *A01G 9/24* | (2006.01) |
| *G16Y 10/05* | (2020.01) |
| *G16Y 20/10* | (2020.01) |
| *G16Y 40/10* | (2020.01) |
| *G16Y 40/30* | (2020.01) |

(52) U.S. Cl.
CPC ............. *A01G 9/243* (2013.01); *A01G 9/249* (2019.05); *G16Y 10/05* (2020.01); *G16Y 20/10* (2020.01); *G16Y 40/10* (2020.01); *G16Y 40/30* (2020.01)

(58) Field of Classification Search
CPC ........ A01G 9/249; A01G 9/243; G16Y 10/05; G16Y 20/10; G16Y 40/10; G16Y 40/30
See application file for complete search history.

(56) References Cited

U.S. PATENT DOCUMENTS

| 9,894,729 | B2 | 2/2018 | Forbis |
| 2015/0173302 | A1 | 6/2015 | Duncan |
| 2017/0188531 | A1* | 7/2017 | Daniels ................. A01G 7/045 |
| 2018/0288943 | A1* | 10/2018 | Boyde .................... F21V 13/04 |
| 2021/0315168 | A1* | 10/2021 | Readick ................. F24S 23/70 |
| 2021/0388959 | A1 | 12/2021 | Farkas |

(Continued)

FOREIGN PATENT DOCUMENTS

| CN | 104663266 B | 2/2017 |
| JP | 6328015 B2 | 5/2018 |

OTHER PUBLICATIONS

"How to Feed the World in 2050", downloaded from the Internet on Feb. 15, 2023, 35 pages, <https://www.fao.org/fileadmin/templates/wsfs/docs/expert_paper/How_to_Feed_the_World_in_2050.pdf>.

(Continued)

*Primary Examiner* — Mong-Shune Chung
(74) *Attorney, Agent, or Firm* — Joseph P. Curcuru

(57) ABSTRACT

The present inventive provides for a method of enhancing photosynthesis using IoT. The method includes obtaining data related to at least one crop and at least one location. Respective crop features and location features are extracted from the obtained data. At least one of photosynthetic rate potential, photosynthetic rate limiting conditions, and potential loss for the at least one crop at the location is determined based on the extracted crop features and location features. Ameliorative actions are calculated based on the determined at least one of photosynthetic rate potential, photosynthetic rate limiting conditions, and potential loss for the at least one crop at the location.

20 Claims, 3 Drawing Sheets

(56) References Cited

U.S. PATENT DOCUMENTS

2022/0124988 A1    4/2022   Booth
2022/0243876 A1*   8/2022   Pahlevaninezhad ...... F21K 9/60

OTHER PUBLICATIONS

Burns-Millyard, Kathy, "How to Use Mirrors to Increase Light for Plants", Updated Jul. 13, 2021, 13 pages, (https://www.ehow.com/how_6457746_use-mirrors-increase-sunlight-plants.html>.

Meligy et al., "Analysis and Design of IoT-Enabled, Low-Cost Distributed Angle Measurement System", Presented at the 6th International Electronic Conference on Sensors and Applications, Nov. 15, 2019-Nov. 30, 2019; Proceedings 2019, 42, 58; doi:10.3390/ecsa-6-06534, Published Nov. 14, 2019, 6 pages.

Poore, Joseph, "How world's farmland is shrinking, and why it may be a good thing", Post Magazine, Published Aug. 24, 2017, <https://www.scmp.com/magazines/post-magazine/long-reads/article/2108067/how-worlds-farmland-shrinking-and-why-it-could-be>, 1 page.

* cited by examiner

300

THE OBTAINMENT AND ANALYSIS COMPONENT 202 CAN OBTAIN DATA RELATED TO AT LEAST ONE CROP AND/OR LOCATION AND EXTRACT FEATURES THEREFROM
302

THE OBTAINMENT AND ANALYSIS COMPONENT 202 CAN DETERMINE ACTUAL AND/OR PROJECTED PHOTOSYNTHETIC RATE POTENTIAL, PHOTOSYNTHETIC RATE LIMITING CONDITIONS, AND/OR POTENTIAL LOSS FOR A CROP AT THE LOCATION BASED ON THE EXTRACTED FEATURES
304

THE IMPLEMENTATION COMPONENT 204 CAN CALCULATE AND PERFORM AMELIORATIVE ADJUSTMENTS BASED ON THE DETERMINED ACTUAL AND/OR PROJECTED PHOTOSYNTHETIC RATE POTENTIAL, PHOTOSYNTHETIC RATE LIMITING CONDITIONS, AND/OR POTENTIAL LOSS FOR A CROP AT THE LOCATION
306

*FIG. 3*

ENHANCING PHOTOSYNTHESIS USING IoT

BACKGROUND

Exemplary embodiments of the present inventive concept relate to enhancing photosynthesis, and more particularly, to enhancing photosynthesis using IoT.

The world's population will increase 34 percent to 9.1 billion by 2050. In order to feed the rapidly growing world population, food production yields must increase by 70 percent. However, the world's available farmland is shrinking; for the first time in recorded history, per hectare crop production is becoming saturated. Every 2 years, an area of land the size of Britain is abandoned. Moreover, the net profits from farming are in decline. The farming industry needs a viable means to increase crop yields independent of farmable land acquisition.

SUMMARY

Exemplary embodiments of the present inventive concept relate to a method, a computer program product, and a system of enhancing photosynthesis using IoT.

According to an exemplary embodiment of the present inventive concept, a method of enhancing photosynthesis using IoT is provided. The method includes obtaining data related to at least one crop and at least one location. Respective crop features and location features are extracted from the obtained data. At least one of photosynthetic rate potential, photosynthetic rate limiting conditions, and potential loss for the at least one crop at the location is determined based on the extracted crop features and location features. Ameliorative actions are calculated based on the determined at least one of photosynthetic rate potential, photosynthetic rate limiting conditions, and potential loss for the at least one crop at the location.

According to an exemplary embodiment of the present invention, a computer program product is provided for enhancing photosynthesis using IoT. The computer program product includes one or more computer-readable storage media and program instructions stored on the one or more non-transitory computer-readable storage media capable of performing a method. The method includes obtaining data related to at least one crop and at least one location. Respective crop features and location features are extracted from the obtained data. At least one of photosynthetic rate potential, photosynthetic rate limiting conditions, and potential loss for the at least one crop at the location is determined based on the extracted crop features and location features. Ameliorative actions are calculated based on the determined at least one of photosynthetic rate potential, photosynthetic rate limiting conditions, and potential loss for the at least one crop at the location.

According to an exemplary embodiment of the present invention, a computer system is provided for enhancing photosynthesis using IoT. The computer system includes one or more computer processors, one or more computer-readable storage media, and program instructions stored on the one or more of the computer-readable storage media for execution by at least one of the one or more processors capable of performing a method. The method includes obtaining data related to at least one crop and at least one location. Respective crop features and location features are extracted from the obtained data. At least one of photosynthetic rate potential, photosynthetic rate limiting conditions, and potential loss for the at least one crop at the location is determined based on the extracted crop features and location features. Ameliorative actions are calculated based on the determined at least one of photosynthetic rate potential, photosynthetic rate limiting conditions, and potential loss for the at least one crop at the location.

BRIEF DESCRIPTION OF THE DRAWINGS

The following detailed description, given by way of example and not intended to limit the exemplary embodiments solely thereto, will best be appreciated in conjunction with the accompanying drawings, in which:

FIG. 3 illustrates a flowchart of a method of the enhancing photosynthesis using IoT 300, in accordance with an exemplary embodiment of the present inventive concept.

Figure 1:
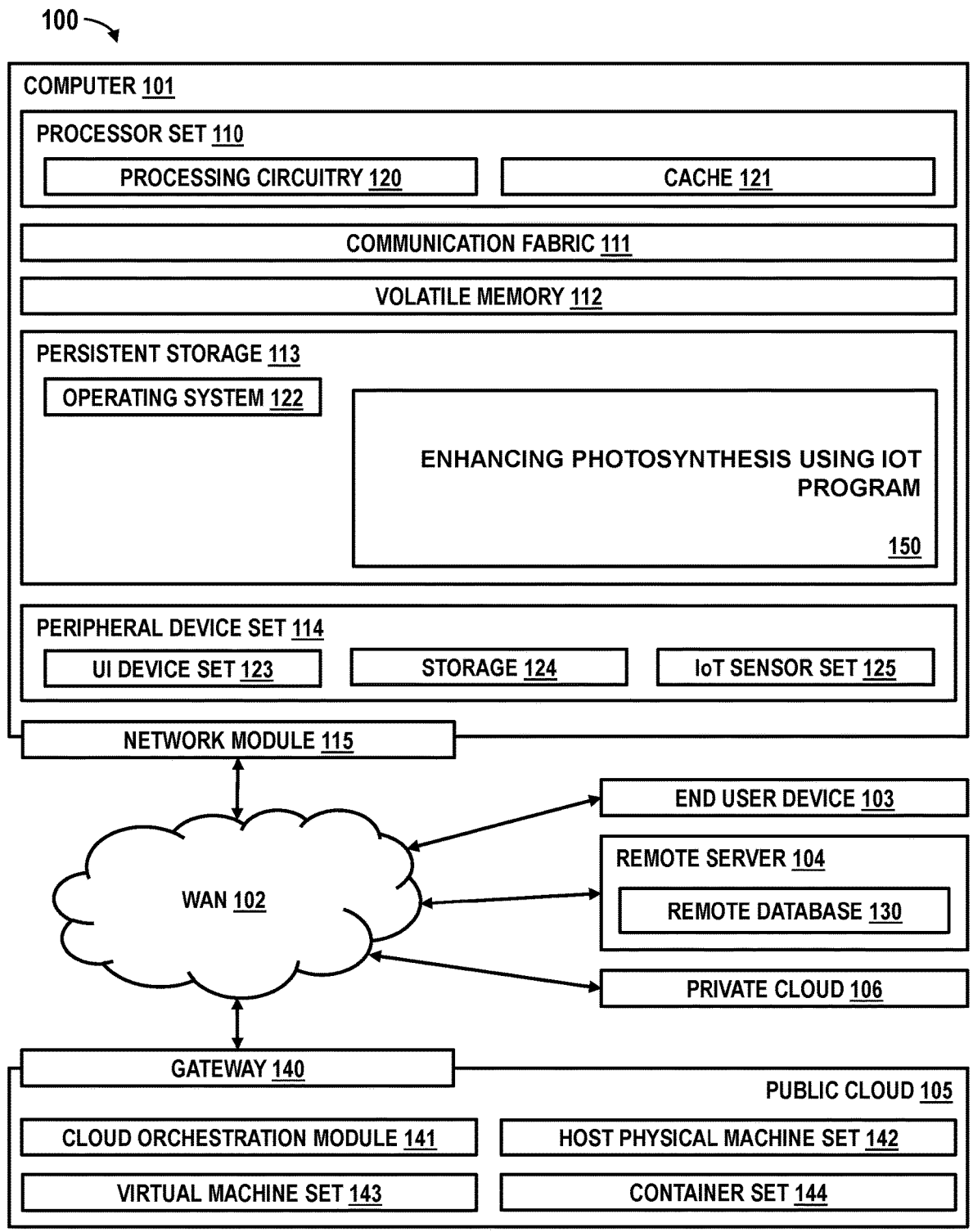
FIG. 1 illustrates a schematic diagram of computing environment 100 including an enhancing photosynthesis using IoT program 150, in accordance with an exemplary embodiment of the present inventive concept.

It is to be understood that the included drawings are not necessarily drawn to scale/proportion. The included drawings are merely schematic examples to assist in understanding of the present inventive concept and are not intended to portray fixed parameters. In the drawings, like numbering may represent like elements.

DETAILED DESCRIPTION

Exemplary embodiments of the present inventive concept are disclosed hereafter. However, it shall be understood that the scope of the present inventive concept is dictated by the claims. The disclosed exemplary embodiments are merely illustrative of the claimed system, method, and computer program product. The present inventive concept may be embodied in many different forms and should not be construed as limited to only the exemplary embodiments set forth herein. Rather, these included exemplary embodiments are provided for completeness of disclosure and to facilitate an understanding to those skilled in the art. In the detailed description, discussion of well-known features and techniques may be omitted to avoid unnecessarily obscuring the presented exemplary embodiments.

References in the specification to "one embodiment," "an embodiment," "an exemplary embodiment," etc., indicate that the embodiment described may include a particular feature, structure, or characteristic, but not every embodiment may necessarily include that feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether explicitly described.

In the interest of not obscuring the presentation of the exemplary embodiments of the present inventive concept, in the following detailed description, some processing steps or operations that are known in the art may have been combined for presentation and for illustration purposes, and in some instances, may have not been described in detail. Additionally, some processing steps or operations that are known in the art may not be described at all. The following detailed description is focused on the distinctive features or elements of the present inventive concept according to various exemplary embodiments.

As mentioned above, crop yields must increase 70 percent by 2050 to keep pace with a projected 34 percent increase in the world population despite dwindling available farmland. At each stage from germination to harvest, crops require different levels of light, temperature, and water for optimal photosynthetic yields. Photosynthetic yields may also vary by location features. Often, crops do not get sufficient light precisely when required to sustain optimal photosynthesis. On the other hand, excess light can also hamper photosynthesis (i.e., photoinhibition) or exacerbate existing a moisture deficit. The present inventive concept provides for a method, computer program product, and system for enhancing photosynthesis using IoT. The present inventive concept regulates sunlight irradiance according to various real-time and projected crop features and location features.

FIG. 1 illustrates a schematic diagram of computing environment 100 including an enhancing photosynthesis using IoT program 150, in accordance with an exemplary embodiment of the present inventive concept.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as an enhancing photosynthesis using IoT program 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
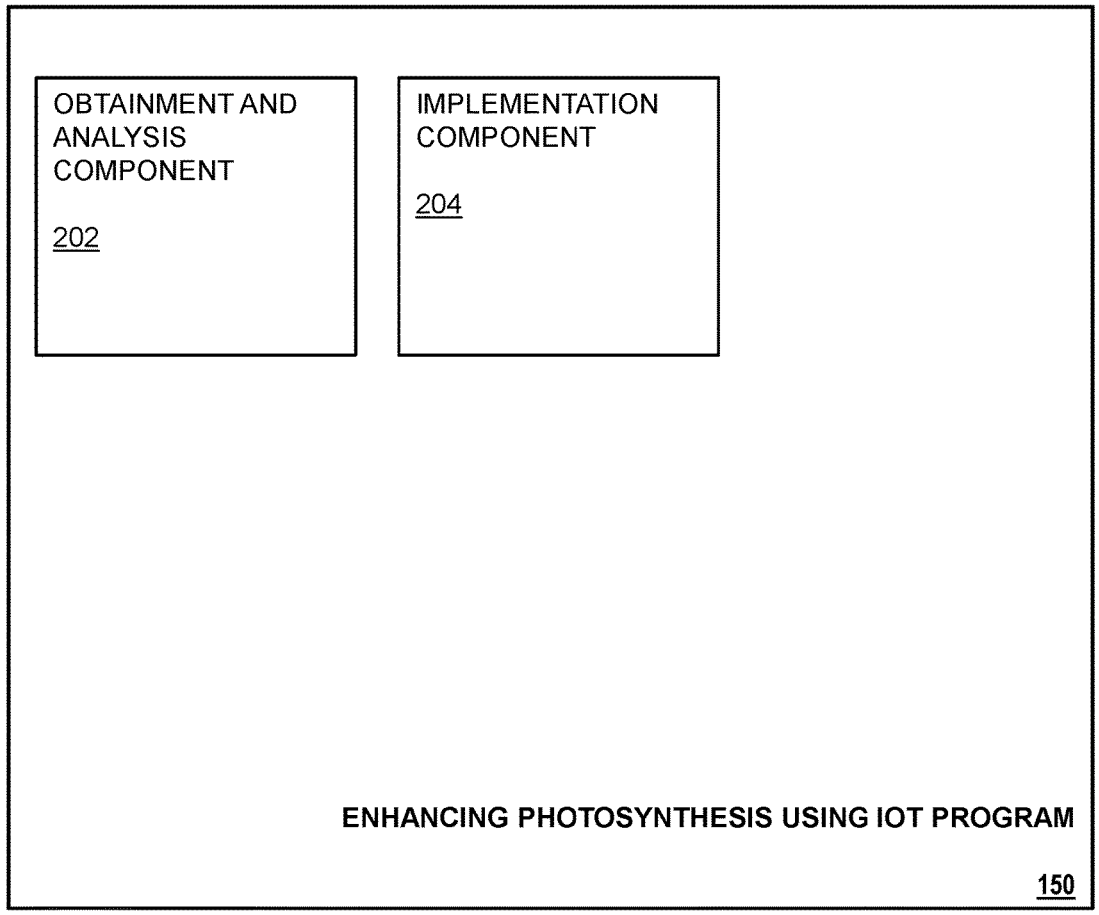
FIG. 2 illustrates a block diagram of components included in the enhancing photosynthesis using IoT program 150, in accordance with an exemplary embodiment of the present invention.

FIG. 2 illustrates a block diagram of components included in an enhancing photosynthesis using IoT program 150, in accordance with an exemplary embodiment of the present invention.

An obtainment and analysis component 202 can obtain pre-recorded and/or real-time data (e.g., multimedia) related to actual and/or candidate crops and/or locations. The obtained data can be provided by a user and/or retrieved autonomously (e.g., satellite imaging, in-situ measurements/imaging, database search, website search, etc.), such as upon a triggering condition (e.g., in-situ measurement outside a predetermined parameter, month/season/time of day, new crop selection, weather forecast, etc.). The obtainment and analysis component 202 can extract features from the obtained data using corresponding artificial intelligence (AI) processes (e.g., natural language processing (NLP), computer vision, audio analysis, etc.). The extracted crop features can include a type, cultivation cost, market price, density, arrangement, irradiance, temperature, age, vitality (e.g., disease, withering, tilting, etc.), and/or resource (e.g., sunlight, water, temperature, etc.) level and/or crop age dependent photosynthetic yields. The extracted location features can include past, present, and/or future weather, time of day variable irradiance/heat and/or corresponding sun position(s), topography, height relative to sea level, crop occupied sub-locations, available sub-locations, cost of alterations to landscape, rent/cost, in situ photosynthetic resource levels (e.g., soil quality (e.g., moisture, temperature, chemical composition, sunlight, carbon dioxide, water, etc.), historic yields/costs, temperature, humidity, wind, carbon dioxide levels, etc. When at least one of crop and location has defined candidates and/or is pre-selected, the obtainment and analysis component 202 can select at least one of the crop and/or the location based on the extracted features and/or user input criteria (e.g., minimum crop yield, minimum profits, maximum costs, designated sub-locations, etc.). The obtainment and analysis component 202 can determine actual and/or projected photosynthetic rate potential, photosynthetic rate limiting conditions, and/or potential loss for a crop at the location based on an analysis of the extracted crop features and location features. The determined actual and/or projected photosynthetic rate potential, photosynthetic rate limiting conditions, and/or potential loss for the crop at the location can be presented to the user with statistical probabilities of occurrence, quantified effects (e.g., crop viability %, crop photosynthetic yield rate, profit margin, etc.).

For example, a user selects a plot of farmland as a location. The obtainment and analysis component 202 retrieves and analyzes real-time and historic satellite imaging of the farmland, data from a digital almanac, and soil measurements from in-situ machines regarding nutrient profile and moisture. The obtainment and analysis component also obtains crop features related to various crops historically grown in the vicinity (e.g., kale, spinach, blueberries, etc.) and extracts crop features therefrom. The obtainment and analysis component 202 determines that spinach would be optimal for growing on the farmland based on the extracted local features and crop features for spinach. The obtainment and analysis component 202 detects, by satellite imaging and in-situ measurements, that sunlight irradiance at farmland adjacent to a protected wooded area is inadequate for optimal photosynthetic yields based on the extracted features and confirmed in real-time. Moreover, it is winter, and the temperatures are projected to imminently decline at the location to below tolerable levels for the spinach given historic flash freezes. Sunlight begins to wane after noon and gets progressively dimmer in the winter months. Shade from adjacent trees further exacerbates the issue. The rate limiting effect of the inadequate sunlight is predicted to decrease photosynthetic yields for crops adjacent to the wooded area by 25% and the flash freezes (most problematic at night) have a 30% chance to cause total crop loss.

The implementation component 204 can perform calculations and orchestrate ameliorative actions (e.g., modify photosynthetic resource levels and/or prevent crop loss at the location) based on the determined actual and/or projected crop photosynthetic rate potential, crop photosynthetic rate limiting conditions, and/or crop loss at the location. The implementation component 204 can be connected to at least one in-situ machine. The at least one in-situ machine can be equipped with a panel that includes a photoabsorbent material (e.g., a solar panel) and/or a mirror (e.g., thermal reflector panel and/or irradiance reflector panel) operated by an actuator. The actuator can move the panel horizontally and/or vertically, change the panel angle relative to a crop and/or another panel, rotate the panel, and/or otherwise tilt the panel to increase or decrease heat, sunlight irradiance, shade, and/or temperature. In an embodiment of the present inventive concept, the photoabsorbent material and the mirror can be included in a same panel as different portions thereof (e.g., opposite sides, opposite edges, etc.) and interchanged by the actuator. In the case of a photoabsorbent material, absorbed sunlight irradiance can be used to power the actuator, the in-situ machine, a connected heating unit, and/or a connected artificial UV light source. The at least one in-situ machine can be stationary (e.g., adjacent to a crop) or possess a capacity for mobility (e.g., wheeled, flight capable, etc.).

The implementation component 204 can calculate cost-benefits (e.g., expense versus crop preservation/enhancement/averted loss), in-situ machine positions, panel angles, types, and/or positions, and/or irradiance/heat intensities involved in ameliorative actions. Sunlight irradiance redirection and consequently mirror and/or photoabsorbent material position/angle may vary according to time of day, sun position, season, weather, crop age/health, and/or location terrain. Consequently, the panel and/or in-situ machines can be automatically adjusted in gradual increments accordingly while being sensitive to real-time changes. A network of in-situ devices can be engaged by the implementation component 204 to perform ameliorative actions cooperatively (e.g., substantially instantaneously positioned and angled to reflect light across a network of mirrors from disparate sub-locations, jointly enhance heat/sunlight irradiance to a crop, etc.). If the soil is determined to be sub-optimally moist, the implementation component 204 can angle the mirror away from the base of the crop or vice versa if there is excessive moisture. If the sunlight irradiance is inducing photoinhibition of the crop, the implementation component 204 can re-angle the mirror, move the at least one in-situ machine, or switch to the photoabsorbent material. Similarly, if the sunlight irradiance is inadequate, the implementation component 204 can adjust the angle of reflection to redistribute light to certain areas of the crop, supplement with artificial UV light, adjust the angle to enhance irradiance intensity, mobilize another in-situ machine, or switch to the mirror from the photoabsorbent material.

In an embodiment of the present inventive concept:

The control of reflector can be precise and subject to small step change while taking a whole prediction horizon into account.

For instance, the panel angle can be chosen such that it is optimal for next 'K' steps, considering the continuous change in sun position.

a. $J = \sum_{i=1}^{N} w_{\delta_i}(\delta_i^r - \delta_i^m)^2 + \sum_{i=1}^{N} w_{u\delta_i}(\Delta u)^2$ b. subject to $\delta^{min} \leq \delta_i^m \leq \delta^{max}$
c. J—cost function over the receding horizon
d. $\beta_i^r$—optimal reflector angle for the instant 'i'
e. $\delta_i^m$—measured reflector angle for the instant 'i'
f. u—reflector controller variable
g. $w_{\delta_i}$—weighting coefficient for reflector angle
h. $w_{u\delta_i}$—penalizing coefficient for big changes in reflector angle
i. $\delta^{max}, \delta^{min}$—Maximum and minimum limit for reflector angle For example, the implementation component 204 sends mobile in-situ machines to heat spinach crops at night that have been primarily using an equipped photoabsorbent panel to absorb solar energy during the day. The mobile in-situ machines are equipped with heat generators which they use to heat the spinach and thaw surrounding snow with the added benefit on increasing soil moisture, thus also decreasing ameliorative action cost. During the day, the implementation component 204 directs a stationary in-situ machine to direct sunlight from centrally located spinach crops (which are already nearly saturated with sunlight) to the sunlight starved spinach adjacent to the protected wooded area. Although the comparably sized central spinach crops will realize a 10% loss in photosynthetic yield from the redirection of sunlight irradiance, the spinach adjacent to the wooded area is calculated to experience a projected 25% increase in photosynthetic yields, thus increasing overall profit margins and crop yield.

FIG. 3 illustrates a flowchart of enhancing photosynthesis using IoT 300, in accordance with an exemplary embodiment of the present inventive concept.

The obtainment and analysis component 202 can obtain data related to at least one crop and/or location and extract features therefrom (step 302).

The obtainment and analysis component 202 can determine actual and/or projected photosynthetic rate potential, photosynthetic rate limiting conditions, and/or potential loss for a crop at the location based on the extracted features (step 304).

The implementation component 204 can calculate and perform ameliorative adjustments based on the determined actual and/or projected photosynthetic rate potential, photosynthetic rate limiting conditions, and/or potential loss for a crop at the location (step 306).

Based on the foregoing, a computer system, method, and computer program product have been disclosed. However, numerous modifications, additions, and substitutions can be made without deviating from the scope of the exemplary embodiments of the present inventive concept. Therefore, the exemplary embodiments of the present inventive concept have been disclosed by way of example and not by limitation.

What is claimed is:

1. A method of enhancing photosynthesis using IoT, the method comprising:
obtaining data related to at least one crop and at least one location;
extracting respective crop features and location features from the obtained data;
determining at least one of photosynthetic rate potential, photosynthetic rate limiting conditions, and potential loss for the at least one crop at the location based on the extracted crop features and location features;
presenting to a user, through a user interface, the determined at least one of photosynthetic rate potential, photosynthetic rate limiting conditions, and potential loss for the at least one crop at the location as statistical probabilities of occurrence and quantified effects; and
calculating ameliorative actions based on the determined at least one of photosynthetic rate potential, photosynthetic rate limiting conditions, and potential loss for the at least one crop at the location.

2. The method of claim 1, further comprising:
performing the calculated ameliorative actions, wherein the performing the calculated ameliorative actions includes altering a position of at least one reflector or mirror relative to the at least one crop at the location.

3. The method of claim 2, wherein the altering of the position of the at least one reflector or mirror is based on real-time or projected sunlight irradiance to the at least one crop or real-time or projected location temperature.

4. The method of claim 2, wherein the altering of the position of the at least one reflector or mirror occurs by automatically in gradual increments that correspond to the time of day and sun position unless real-time or projected weather deviations occur.

5. The method of claim 2, wherein the performing of the ameliorative actions is based at least in part on a cost-benefit analysis.

6. The method of claim 2, wherein the performing of the ameliorative actions includes reflecting sunlight irradiance or heat to the at least one crop by multiple reflectors.

7. The method of claim 1, wherein the obtaining data related to the at least one crop and the at least one location occurs upon a triggering event and includes real-time data.

8. A computer program product for enhancing photosynthesis using IoT, the computer program product comprising:
one or more non-transitory computer-readable storage media and program instructions stored on the one or more non-transitory computer-readable storage media capable of performing a method, the method comprising:
obtaining data related to at least one crop and at least one location;
extracting respective crop features and location features from the obtained data;
determining at least one of photosynthetic rate potential, photosynthetic rate limiting conditions, and potential loss for the at least one crop at the location based on the extracted crop features and location features;
presenting to a user, through a user interface, the determined at least one of photosynthetic rate potential, photosynthetic rate limiting conditions, and potential loss for the at least one crop at the location as statistical probabilities of occurrence and quantified effects; and
calculating ameliorative actions based on the determined at least one of photosynthetic rate potential, photosynthetic rate limiting conditions, and potential loss for the at least one crop at the location.

9. The computer program product of claim 8, further comprising:
performing the calculated ameliorative actions, wherein the performing the calculated ameliorative actions includes altering a position of at least one reflector or mirror relative to the at least one crop at the location, wherein the at least one reflector or mirror shares a panel with a photoabsorbent material.

10. The computer program product of claim 9, wherein the altering of the position of the at least one reflector or mirror is based on real-time or projected sunlight irradiance to the at least one crop or real-time or projected location temperature.

11. The computer program product of claim 9, wherein the altering of the position of the at least one reflector or mirror occurs by automatically in gradual increments that correspond to the time of day and sun position unless real-time or projected weather deviations occur.

12. The computer program product of claim 9, wherein the performing of the ameliorative actions is based at least in part on a cost-benefit analysis.

13. The computer program product of claim 9, wherein the performing of the ameliorative actions includes reflecting sunlight irradiance or heat to the at least one crop by multiple reflectors.

14. The computer program product of claim 8, wherein the obtaining data related to the at least one crop and the at least one location occurs upon a triggering event and includes real-time data.

15. A computer system for enhancing photosynthesis using IoT, the computer system comprising:
one or more computer processors, one or more computer-readable storage media, and program instructions stored on the one or more of the computer-readable storage media for execution by at least one of the one or more processors capable of performing a method, the method comprising:
obtaining data related to at least one crop and at least one location;
extracting respective crop features and location features from the obtained data;
determining at least one of photosynthetic rate potential, photosynthetic rate limiting conditions, and potential loss for the at least one crop at the location based on the extracted crop features and location features;
presenting to a user, through a user interface, the determined at least one of photosynthetic rate potential, photosynthetic rate limiting conditions, and potential loss for the at least one crop at the location as statistical probabilities of occurrence and quantified effects; and
calculating ameliorative actions based on the determined at least one of photosynthetic rate potential, photosynthetic rate limiting conditions, and potential loss for the at least one crop at the location.

16. The computer system of claim 15, further comprising:
performing the calculated ameliorative actions, wherein the performing the calculated ameliorative actions includes altering a position of at least one reflector or mirror relative to the at least one crop at the location.

17. The computer system of claim 16, wherein the altering of the position of the at least one reflector or mirror is based on real-time or projected sunlight irradiance to the at least one crop or real-time or projected location temperature.

18. The computer system of claim 16, wherein the altering of the position of the at least one reflector or mirror occurs by automatically in gradual increments that correspond to the time of day and sun position unless real-time or projected weather deviations occur.

19. The computer system of claim 16, wherein the performing of the ameliorative actions is based at least in part on a cost-benefit analysis.

20. The computer system of claim 15, wherein the obtaining data related to the at least one crop and the at least one location occurs upon a triggering event and includes real-time data.

* * * * *